Dec. 13, 1932.   M. LEUPOLD   1,891,166
TILTING ENGINE WING PLANE
Filed May 23, 1931   4 Sheets-Sheet 1
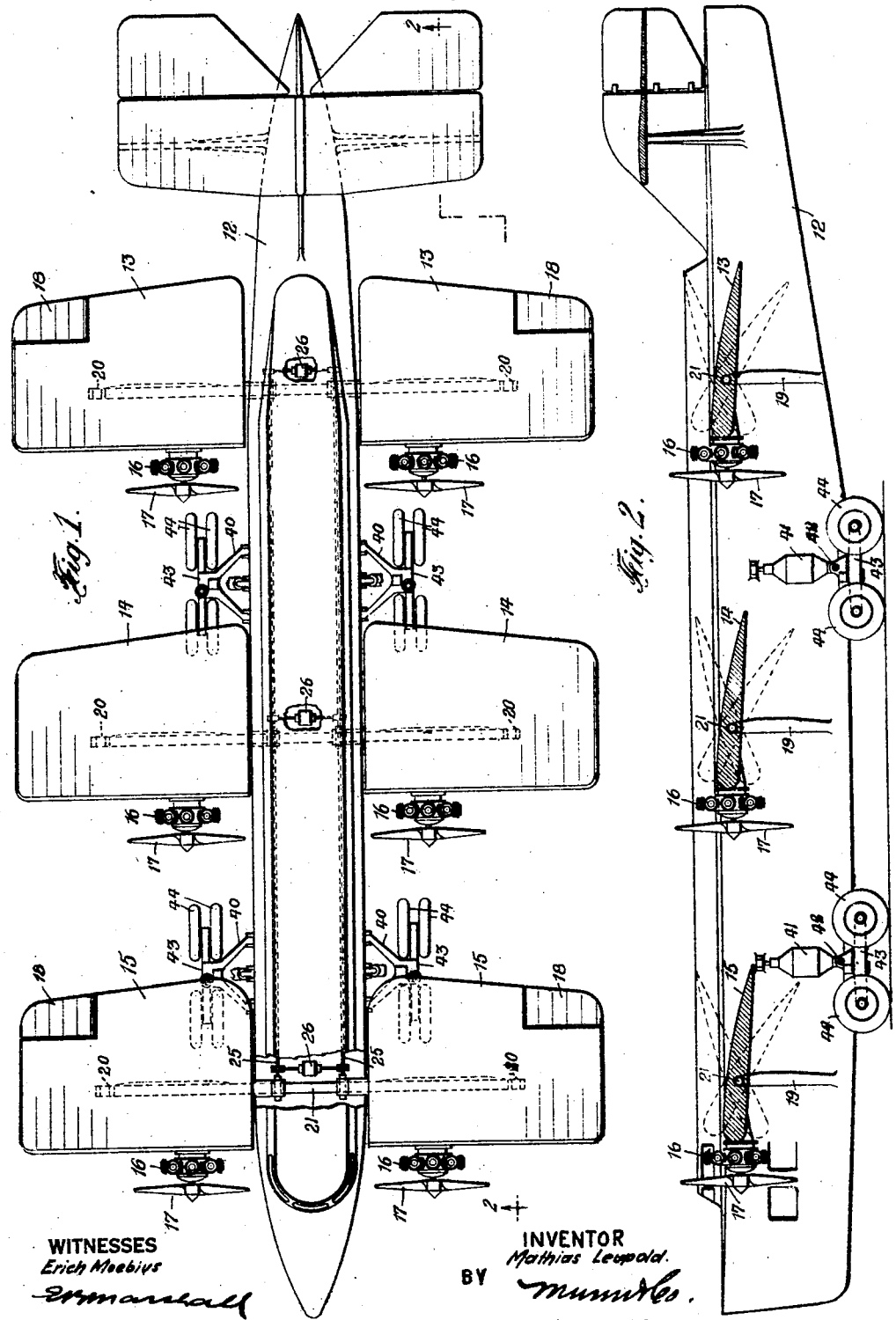

Dec. 13, 1932.  M. LEUPOLD  1,891,166
TILTING ENGINE WING PLANE
Filed May 23, 1931  4 Sheets-Sheet 2
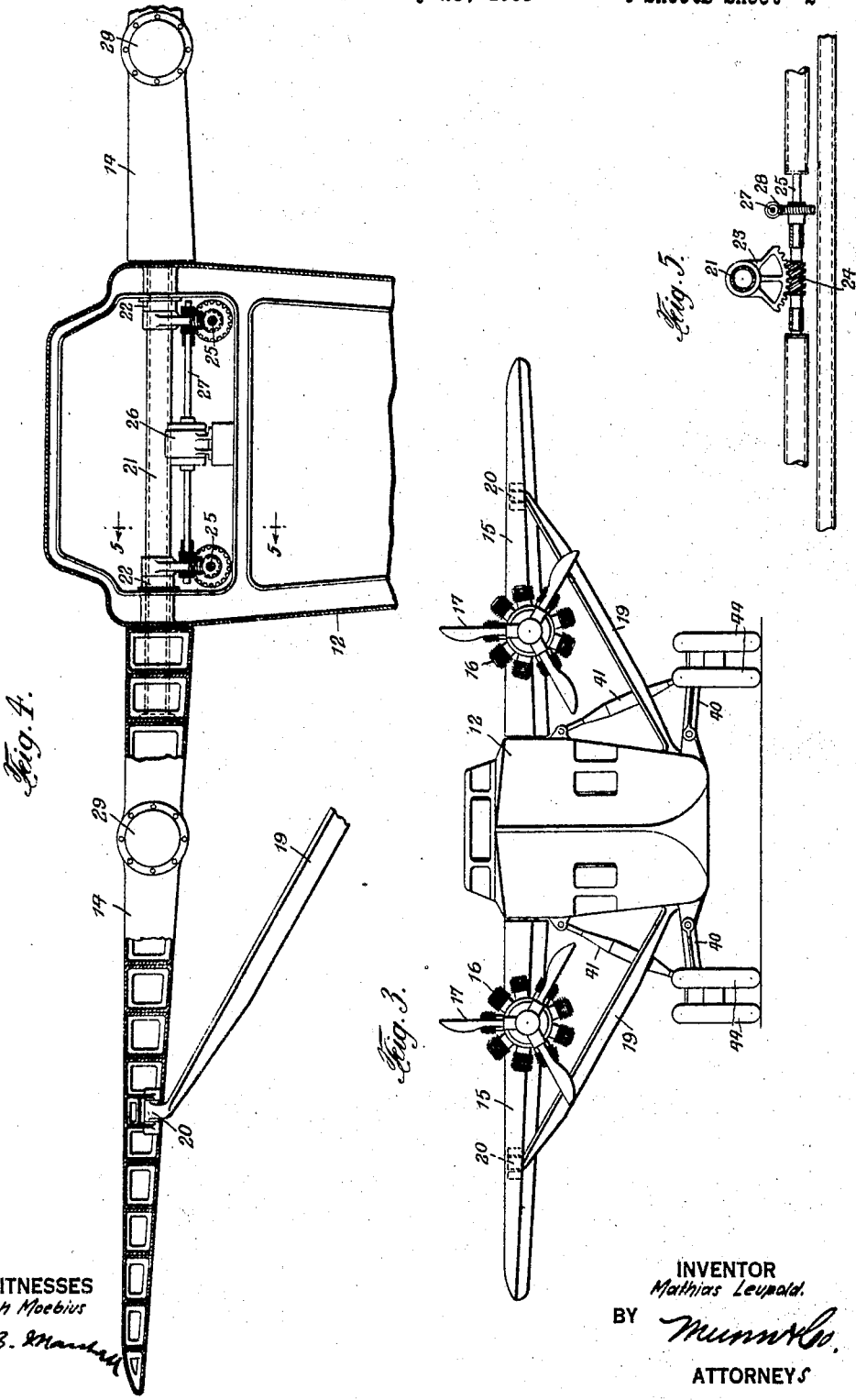
WITNESSES
Erich Moebius
INVENTOR
Mathias Leupold.
BY
ATTORNEYS Dec. 13, 1932.  M. LEUPOLD  1,891,166
TILTING ENGINE WING PLANE
Filed May 23, 1931  4 Sheets-Sheet 3
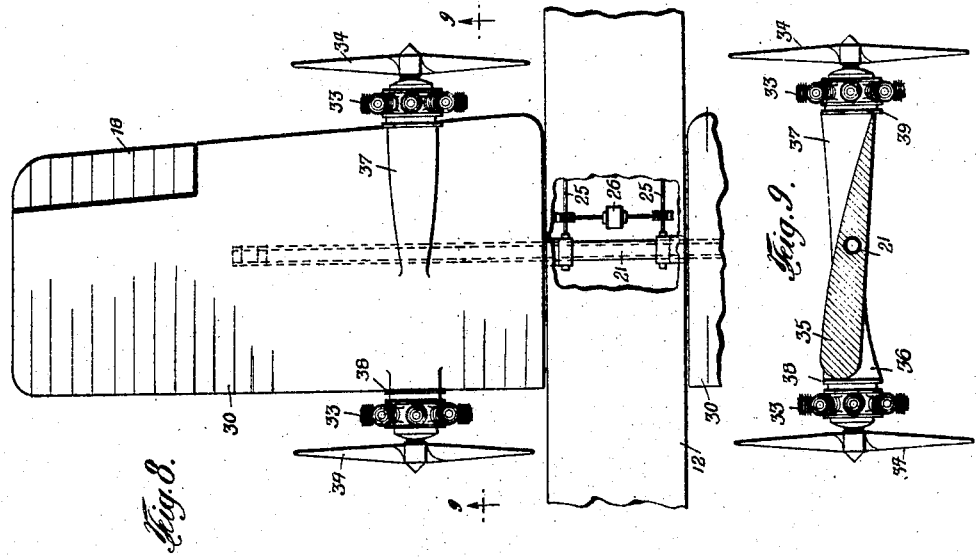
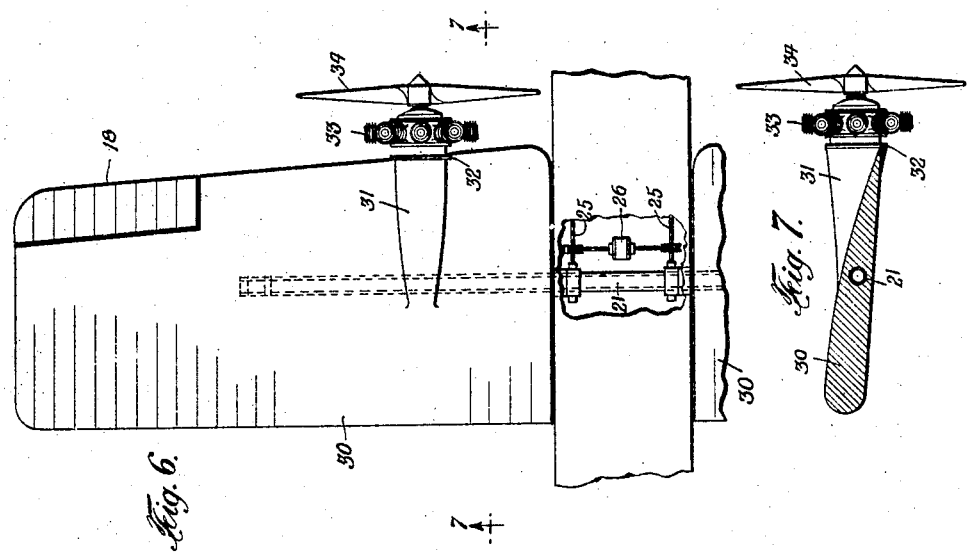
WITNESSES
Erich Moebius.
INVENTOR
Mathias Leupold.
BY
ATTORNEYS Dec. 13, 1932.  M. LEUPOLD  1,891,166
TILTING ENGINE WING PLANE
Filed May 23, 1931   4 Sheets-Sheet 4
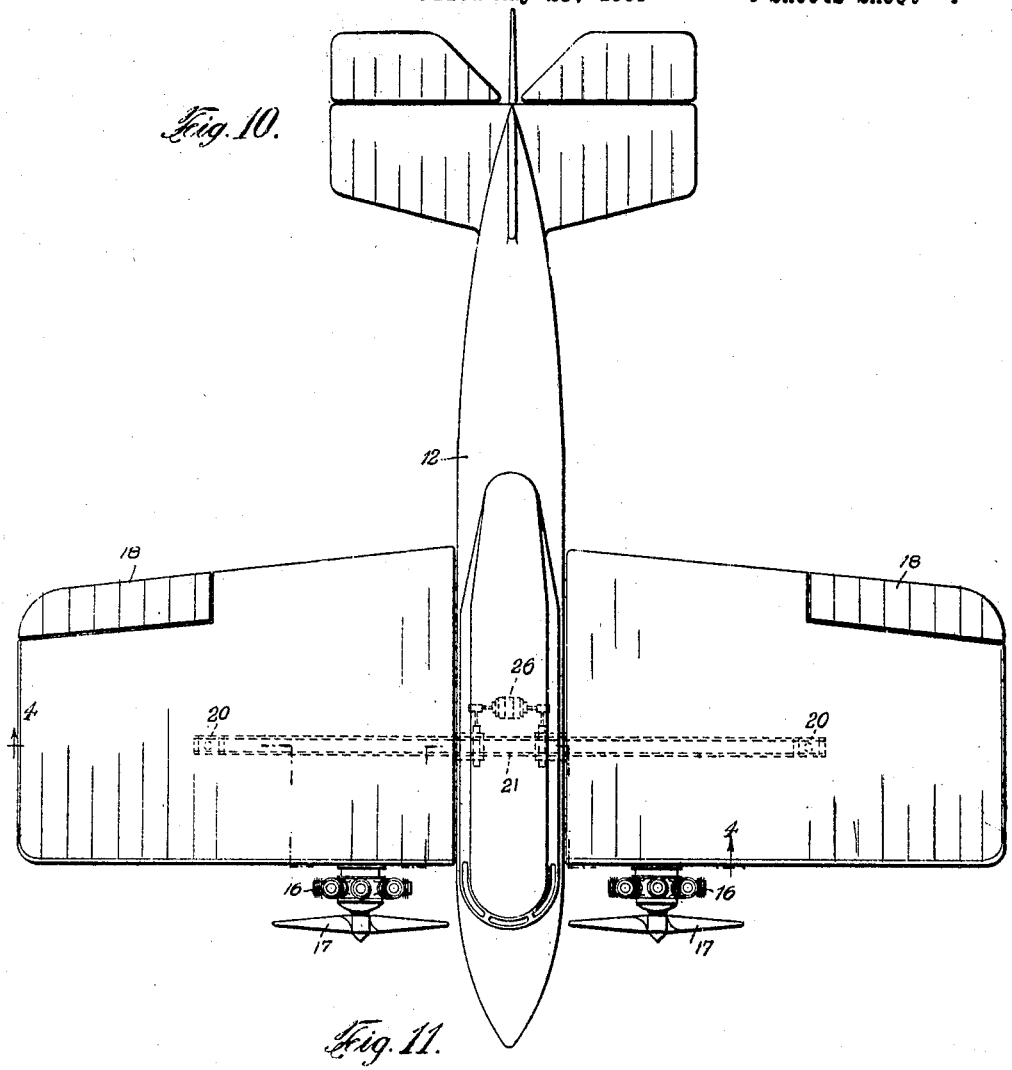
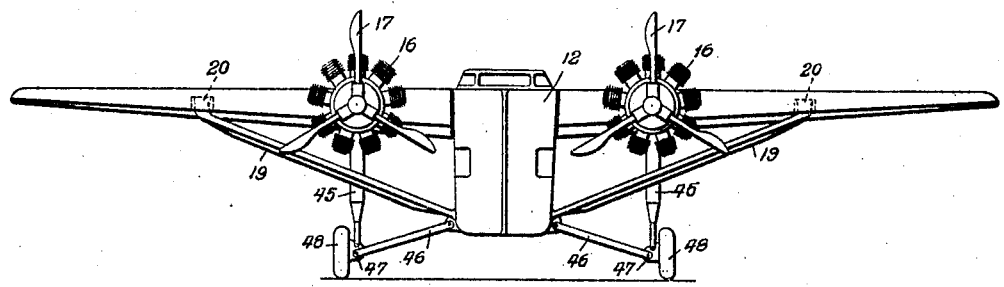
WITNESSES
Erich Moebius
INVENTOR
Mathias Leupold.
BY
ATTORNEYS Patented Dec. 13, 1932

1,891,166

UNITED STATES PATENT OFFICE

MATHIAS LEUPOLD, OF JAMAICA, NEW YORK

TILTING-ENGINE WING PLANE

Application filed May 23, 1931. Serial No. 539,574.

An object of the invention is to provide an airplane or airship having a tilting wing or wings on which there are mounted propellers. Preferably the wings are mounted in pairs, a wing in each pair being disposed at each side of the airplane, and motors are also preferably mounted on the wings and are connected with the propellers for operating the latter. The propellers may be disposed at the front or at the rear of the wings, or, if desired, a wing or wings may be provided with two propellers, one disposed at the front and the other disposed at the rear of the wing or wings.

Another object of the invention is to provide an airplane or airship which is provided with wings movable relatively to the fuselage of the airplane or airship, there being propellers mounted on the wings which will enable the airplane or airship to rise rapidly in the air in a limited area, attain high speed, and with the ability to land with safety at a very low speed in a limited area without serious shock or jar.

Still another object of the invention is to provide a combination helicopter and airplane having the lifting characteristics of the helicopter and the gliding characteristics of the airplane.

A further object of the invention is to provide an airplane having unusual stability and which may be operated with safety, the fuselage of the airplane preserving a horizontal position, not only when flying, but also when ascending and descending.

Additional objects of the invention will appear in the following specification in which the preferred form of the invention is described.

In the drawings similar reference characters refer to similar parts in all the views, of which Figure 1 is a plan view illustrating one form of the invention, Figure 2 is a sectional view on the line 2—2 of Figure 1, Figure 3 is a bow view of Figure 1, Figure 4 is an enlarged fragmentary sectional view illustrating the manner in which the wings are mounted to rock on the fuselage, the view being taken along the lines 4—4 of Figure 10, Figure 5 is a sectional view on the line 5—5 of Figure 4, Figure 6 is an enlarged fragmentary sectional view illustrating a modified form of the invention, Figure 7 is a sectional view on the line 7—7 of Figure 6, Figure 8 is an enlarged fragmentary sectional view illustrating another modified form of the invention, Figure 9 is a sectional view on the line 9—9 of Figure 8, Figure 10 is a plan view illustrating another modified form of the invention, and Figure 11 is a bow view of Figure 10.

It will be understood that while the preferred form of the airplane has three or more pairs of wings, with a wing of each pair disposed at each side of the fuselage and with a propeller on each wing, which makes feasible the construction and operation of very long airplanes having a number of pairs of wings. An airplane may also be constructed in accordance with the invention, having a single pair of wings with a propeller mounted on each wing. It will be understood that the greater the number of wings with their propellers and motors, the greater will be the safety in the operation of the airplane.

By referring to Figure 1 of the drawings, it will be seen that in the preferred form of the airplane a fuselage 12 has three pairs of wings 13, 14 and 15, the wings 15 being disposed at the front of the fuselage, the wings 13 being disposed at the rear of the fuselage, and the wings 14 being disposed intermediate of the wings 13 and 15. Each pair of wings is mounted to rock on a transverse axis, as will be explained subsequently, and there is mounted at the front of each of the wings 13, 14 and 15, a motor 16 with a propeller 17.

It will be seen by again referring to Figure 1 of the drawings, that the wings 13 and 15 are preferably provided with ailerons 18.

It will be understood that, with this construction, the wings 13, 14 and 15 may be tilted simultaneously, together with the propellers 17, upwardly or downwardly, as may be desired, while preserving the horizontal movement of the fuselage. When the pilot is desirous of moving the fuselage horizontally upwardly, the pilot may turn the wings to a steep angle, which angle will be determined to a certain extent on the runway if the take-off is from the land, or by the seaway if the take-off is from the water. and it will also be understood that the angle of incidence will also be determined by the pilot with reference to whether a quick take-off is desired.

As will be subsequently made clear, preferably all the wings will be tilted simultaneously and at the same angle of incidence, and this will also tilt the axes of the motors and propellers, the angle of incidence of the wings and with the shafts of the motors and propellers also tilted. will give both a lifting and a gliding action, which will serve to quickly raise the airplane or airship from the ground or water. When the desired height is reached, the pilot will gradually decrease the angle of incidence of the motor-wings, thereby decreasing the vertical movement of the airplane or airship, and increasing the horizontal speed, so that, when the desired altitude is reached, the motor-wings will be disposed substantially parallel with the fuselage, thereby insuring greater speed to the airplane or airship, but with sufficient angle to keep the airplane or airship at the desired altitude.

Any slight deviation from the horizontal position of the airplane or airship, due to the shifting of weight as passengers may move from one end of the fuselage to the other, or by the shifting of any weight from one end of the fuselage to the other, may be corrected by the ailerons 18.

When it is desired to descend to the land or water, the pilot will tilt the wings downwardly, depending upon the distance within which it is desired to land, and decrease the speed of the motors. When sufficiently near the ground or water, the wings will be tilted upwardly and the motors speeded-up gradually, so as to achieve a position where the forward motion of the airplane or airship is checked by the upward angle of incidence of the wings and where the propellers and motors act as helicopters and, by gradually decreasing the speed of the motors, allow the airplane or airship to settle slowly and evenly on the ground or water.

By referring to Figures 3 and 4 of the drawings, it will be seen that arms 19 extend upwardly and outwardly from the sides of the fuselage 12, and that the outer ends of these arms 19 have bearings 20 in which the wings are journaled. Each pair of wings is connected by a shaft 21 which is journaled in the fuselage at bearings 22, there being secured to each shaft 21 gear sectors 23 which mesh with a worm 24 secured to shafts 25. There is a motor 26 adjacent each shaft 21, each motor 26 having a transverse shaft 27 which is connected with the longitudinally extending shafts 25 by gearing 28. It will be understood, by referring to Figure 4 of the drawings, that there are two longitudinally extending shafts 25 which are connected by gearing 28 with the transverse shafts 27 extending from the motors 26. Therefore, with this construction, the several pairs of wings will be moved in unison and any one of the motors 26 may be used to move all the wings, although preferably the several motors 26 will be used simultaneously to move the wings in all cases, except where one of the motors 26 might be disabled.

The drawings show the preferred manner of tilting and rocking the wings, but it will be understood that any other suitable means may be employed to move the wings on transverse axes relatively to the fuselage.

By referring to Figure 4 it will be seen that there are motor mountings 29 on the wings to which the motors 16 are secured, these motors 16 being fed with fuel in any desired manner from the fuselage or from the wings. The propellers 17 are preferably mounted on the shafts of the motors 16.

In Figures 1, 2 and 3 the motors and propellers are shown at the front of the wings. In the modified form of the invention illustrated in Figures 6 and 7 of the drawings, the motors and propellers are mounted at the rear of the wings, while in the modified form of the invention illustrated in Figures 8 and 9 of the drawings, there are two propellers mounted on each wing, one at the front and one at the rear of the wing, there being a motor for each of these propellers.

In the form of the invention illustrated in Figures 10 and 11 of the drawings, there is a single pair of wings, but these wings are mounted in the manner described with reference to the construction illustrated in Figures 1, 2, 3 and 4 of the drawings, and the motors and propellers are mounted in the manner which has been described.

By referring to Figures 6 and 7 of the drawings, it will be seen that the wing 30 is constructed with an enlarged portion 31 to provide a mounting 32 for the motor 33 carrying the propeller 34. On referring to Figure 9 of the drawings, it will be seen that the wing 35 is provided with an enlarged portion 36 at its forward edge and an enlarged portion 37 at its rear edge, these portions 36 and 37 providing for the motor mountings 38 and 39.

While the subject matter of this application may be used on an airplane, airship or hydroplane, the drawings illustrate the invention as applied to an airplane. Arms 40 extend laterally and arms 41 extend downwardly from the fuselage 12 of the airplane, the arms 41 being pivoted at 42 on transverse axes to trucks 43 on which are mounted wheels 44. The arms 40 are secured to the lower ends of the arms 41. In the form of the invention illustrated in Figures 10 and 11, arms 45 are journaled to the wings at the axes thereof and these arms 45, together with arms 46 which extend laterally from the fuselage, are secured to brackets 47 on which the wheels 48 are mounted.

It will be understood that when the motors and propellers are mounted at the rear of the wings, it will be necessary to dispose the axes of the wings at a sufficiently high point above the bottom of the fuselage to prevent the propellers from striking the ground or water when the wings are elevated for a take-off.

It will be understood that all the motors 16 will be more or less synchronized and will work in unison, so that they will all run at approximately the same speed and they may all be controlled by the pilot in the conventional manner.

It will also be understood that in some cases it is necessary or may be desirable to control the motors 16 in such a manner that one or more of the motors may be run faster or slower than one of the other motors. This will make it possible for the pilot to balance the aircraft in case of the breakage of a steering rudder, or the disabling of a motor or motors 16. This control will also assist the pilot in maneuvering the aircraft under certain conditions.

It should be understood that, while the applicant has shown what he considers to be the best means of positioning the wings relatively to the fuselage, other means may be employed to change the incidence of the wings without departing from the scope of the invention, and that also any landing gear may be used as desired.

What is claimed is:

1. An airplane having a fuselage and a plurality of pairs of supporting wings, a wing in each pair extending at each side of the fuselage, the wings being pivoted on transverse axes between the top and bottom of the wings to the fuselage and above the bottom of the fuselage in approximately a straight line longitudinally of the fuselage, a plurality of motors mounted on edges of the wings with shafts extending from the motors longitudinally of the fuselage and with the axes of the motor shafts disposed between the upper and lower surfaces of the wings respectively, the axes of the wings being disposed nearer the said edges of the wings than the wings' opposite edges which, with the disposal of the motors with the axes of their shafts between the upper and lower surfaces of the wings, will balance each wing and its motor on the axes of the wings, the distance between the motors on the wings and the adjacent wings being approximately the same as the width of the wings, propellers mounted on the motor shafts, and means to rock the wings on their axes.

2. An airplane having a fuselage and a plurality of pairs of supporting wings, a wing in each pair extending at each side of the fuselage, the wings being pivoted on transverse axes between the top and bottom of the wings to the fuselage and above the bottom of the fuselage in approximately a straight line longitudinally of the fuselage, a plurality of motors mounted on edges of the wings with shafts extending from the motors longitudinally of the fuselage and with the axes of the motor shafts disposed between the upper and lower surfaces of the wings respectively, the axes of the wings being disposed nearer the said edges of the wings than the wings' opposite edges which with the disposal of the motors with the axes of their shafts between the upper and lower surfaces of the wings, will balance each wing and its motor on the axes of the wings, the distance between the motors on the wings and the adjacent wings being approximately the same as the width of the wings, propellers mounted on the motor shafts, a plurality of transverse bearings spaced apart longitudinally on the fuselage, longitudinal bearings on the fuselage, a plurality of transverse shafts journaled in the transverse bearings respectively to which the wings are secured, a longitudinal shaft journaled in the longitudinal bearings, means connecting the last mentioned shaft with the first mentioned shafts, a plurality of power means adjacent the first mentioned shafts respectively, and means connecting the power means with the longitudinally extending shaft for rotating the latter.

Signed at New York, in the county of New York, and State of New York, this 21st day of May, 1931.

MATHIAS LEUPOLD.